350-376 SR
XR 3,806,903

United States Patent [19]

Myer

[11] 3,806,903

[45] Apr. 23, 1974

[54] MAGNETO-OPTICAL CYLINDRICAL MAGNETIC DOMAIN MEMORY

[75] Inventor: Jon H. Myer, Woodland Hills, Calif.

[73] Assignee: Hughes Aircraft Company, Culver City, Calif.

[22] Filed: Dec. 6, 1971

[21] Appl. No.: 205,095

[52] U.S. Cl....340/174 YC, 340/174 TF, 340/174 MA, 340/174 PM, 350/151

[51] Int. Cl.......... G11c 11/14, G11c 11/42

[58] Field of Search........340/174 TF, 174 MA, 174 MC, 340/174 PM, 174 YC, 174 SP; 350/151

[56] References Cited

UNITED STATES PATENTS

| | | | |
|---|---|---|---|
| 3,508,221 | 4/1970 | Thiele | 340/174 TF |
| 3,585,614 | 6/1971 | Tabor | 340/174 TF |
| 2,919,432 | 12/1959 | Broadbent | 340/174 MC |
| 3,476,919 | 11/1969 | Bachand | 340/174 MC |
| 3,470,547 | 9/1969 | Bobeck | 340/174 TF |
| 3,683,340 | 8/1972 | Dorsch | 340/174 SP |
| 3,513,452 | 5/1970 | Bobeck et al. | 340/174 TF |
| 3,699,552 | 10/1972 | DeFabritis | 340/174 TF |
| 3,150,356 | 9/1964 | Newman | 340/174 YC |
| 3,688,282 | 8/1972 | Buhrer | 340/174 YC |

FOREIGN PATENTS OR APPLICATIONS

| | | | |
|---|---|---|---|
| 965,596 | 8/1964 | Great Britain | 340/174 SP |

OTHER PUBLICATIONS

IBM Technical Disclosure Bulletin "Magnetic Bubble Domain Display Device" by Chang et al., Vol. 13, No. 5, 10/70; pp. 1187, 1188.

RCA Technical Notes, "Bubble Domain Constructions" by Karlansik et al., TN No. 885 6/4/71.

*Primary Examiner*—Stanley M. Urynowicz, Jr.
*Attorney, Agent, or Firm*—W. H. MacAllister, Jr.; Donald C. Keareney

[57] ABSTRACT

This invention relates to devices employing cylindrical magnetic domains (commonly called bubbles) in a uniaxially anisotropic magnetic medium such as a single crystal platelet for the analysis and storage of digital information. Presence or absence of changes in the state of polarization of polarized light transmitted through one or more of said transparent platelets may be detected to perform a subtractive comparison of an unknown signal comprised of unipolar bits with a reference signal or to provide readout signals from a random access, large scale nondestructive-readout memory. Many different logic configurations may additionally or alternatively be incorporated in these devices by virtue of a unique pattern of conductors used to define bit storage locations in the crystal platelet and magnetic means to confine the magnetic bubbles therein.

24 Claims, 21 Drawing Figures

3806903
OR IN 365/10

MAGNETO-OPTICAL CYLINDRICAL MAGNETIC DOMAIN MEMORY

BACKGROUND OF THE INVENTION

Magnetic domain behavior in general has been studied extensively for many years and the knowledge gained has made possible many techniques and products for the storage and processing of digital information. Thus, magnetic cores, recording wire, tape, drums and discs each broadly utilize some characteristic of magnetic materials. Most of these devices utilize amorphous, opaque ferromagnetic materials and are constrained by the geometry of the magnetic material into two dimensions. Furthermore, in these devices the axis of magnetic polarization employed is usually in the plane of the magnetic medium. They are generally constructed of solid magnetic materials or thick films and the domains therein are in most cases multiple groups rather than singular in nature. Furthermore, the most versatile of these memories, the random access core memory operates with "destructive readout", i.e., the information contained in the memory is destroyed during the reading process and must be subsequently restored and reinstated.

The development of magnetic devices utilizing the concept of a small discrete zone or domain which is moveable in a thin film of magnetic material when means are provided for moving the domain through the film is illustrated in such U.S. Pats. as Nos. 2,919,432; 3,068,453; and 3,125,746 all issued to K. D. Broadbent. The utilization of such moveable magnetic domains in certain single crystal ferromagnetic materials is discussed in U.S. Pat. No. 3,513,452 issued to A. E. Bobeck et al. and in an article which appeared in the June 1971 issue of the magazine "Scientific American" written by Andrew H. Bobeck and H. E. D. Scovil and entitled "Magnetic Bubbles." The magnetic domains or bubbles discussed therein and in the bibliography thereof can be made to assume a right cylindrical shape and can be generated, obliterated, displaced and detected in two dimensions. The axis of magnetic polarization of these bubble domains caused by the magneto crystalline anisotropy lies along the axis of the right cylinder bubble and is chosen to be perpendicular to the plane of the major surface of the magnetic medium or crystal which is the plane in which the bubbles move. Since many of these single crystal materials used are transparent, it becomes possible to monitor domain behavior with the aid of the Faraday effect, that is, the change in the state of polarization of polarized light which is produced when it passes through a magnetic field such as that of the bubble.

The single crystal growth technology developed for the fabrication of active electronic devices employing piezoelectric and semiconducting phenomena and the crystallographic and photolithographic processing techniques previously developed for the manufacture of semiconductor devices and integrated circuits can all be used to fabricate the type of single crystal magnetic domain devices described herein.

While the devices described herein utilize the basic phenomena and scientific laws discussed in the article by Bobeck et al. and the bibliography thereof, it should be pointed out that the devices developed by Bobeck and his associates are primarily intended for use in the central offices of telephone systems where inexpensive large scale, slow access, serially operated devices are desired. The design of devices described by Bobeck thus assumes that bubbles make good shift register memories, that they are useful because they will give maximum bit packing density, that garnets are better than orthoferrites for these purposes and such that bubble systems must be relatively slow in operation by their very nature. The devices described herein, on the other hand, are postulated on the premises that such bubbles can be used to make good random access high speed nondestructive readout or associative memories, that bubbles do not have to be packed to extreme density in order to be highly useful even in large scale or mass memories, that bubble systems can be constructed for fast operation in either the serial or parallel mode, that larger bubbles are easier to detect and that orthoferrite crystals are better than garnet crystals for these purposes. An "orthoferrite" as used herein is deemed to mean a ferromagnetic oxide of the general formula $MFeO_3$, where M is yttrium or a rare earth iron. By "domain" is herein meant a region in a solid within which elementary atomic or molecular magnetic or electric moments are aligned along a common axis. By "easy axis" is meant the crystallographic axis of a single ferromagnetic crystal body which requires minimum saturation magnetization energy and the axis along which spontaneous magnetization occurs.

SUMMARY OF THE INVENTION

The devices disclosed herein use orthoferrite crystals to achieve such bubble devices as a subtractive comparator or a random access memory both of which afford nondestructive readout and fast operation in either the serial or parallel mode. In both devices bubble domain locations are defined by a pattern of conductors deposited on the crystal or on a glass plate which is positioned adjacent to an associated crystal in which the bubble domains are established and controlled by magnetic fields generated by magnets and/or current flow in the conductors on the glass plate. Depending upon the particular nature of the device, one or more of such plate-crystal pairs is positioned axially along the path of a beam of polarized light which may simultaneously illuminate the entire crystal surface of any subdivisions thereof for parallel readout, or which may comprise a flying spot scan for serial readout. Means are provided on the other side of the plate-crystal pair or pairs to analyze or detect a change or changes in the state of polarization of the light transmitted and a photodetector converts such detected change or changes into electrical readout signals. Where two plate-crystal pairs are used in connection with a suitably perforated mask and are fully illuminated throughout the array thereon, it is possible to interrogate one plate (the memory) by electronic signals applied to other (the interrogator) with the same logic pattern as is commonly used in ferrite core memories to define and query an array position but without destroying the contents of the memory.

BRIEF DESCRIPTION OF THE DRAWINGS

The invention will be better understood from the detailed description below taken in conjunction with the drawings attached hereto in which like reference characters refer to like parts throughout and wherein;

In FIG. 1*a* no external biasing field is applied and in the subsequent figures there is shown the effect on the domains as the external biasing field is gradually increased.

FIGS. 8*a* and 8*b* are respectively plan views of a slightly modified and preferred geometry for the *x* and *y* conductors respectively at each intersection whereas

DETAILED DESCRIPTION OF PREFERRED EMBODIMENTS

Figure 1C:
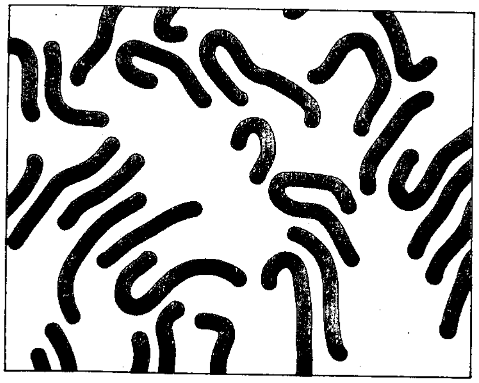
FIGS. 1*a*, 1*b*, 1*c*, 1*d*, 1*e*, and 1*f* are plan views of a typical orthoferrite crystal platelet as seen under a microscope wherein polarized light is alternatively transmitted or not transmitted depending upon the state of the magnetic domains in the plate.

The devices described herein depend upon certain general characteristics of cylindrical magnetic domains in transparent single crystals. In single ferromagnetic crystals, magneto-crystalline fields which align atomic moments in certain preferred directions are strong enough to form domains spontaneously in which the atoms share these preferred orientations.

Also, ferrite crystals (such as yttrium orthoferrite which is in fact the preferred crystal for the devices disclosed herein) contain a single preferred magneto-crystalline axis of magnetization, referred to herein as the easy axis, and all the atomic moments in such a crystal will line up either parallel or antiparallel with it, forming spontaneous intrinsic domains. By slicing a platelet of orthoferrite perpendicular to this easy axis, we obtain an array of randomly spaced, serpentine strip domains having a geometry such as that illustrated in FIG. 1a. This phenomenon may be observed under a Faraday rotation microscope. To minimize the magnetostatic energy in the platelet these serpentine strip domains 11 in crystal platelet 10 align themselves in such a manner that half of them are magnetically oriented into the plane of the major surface of the crystal platelet and half of them are magnetically oriented in the opposite direction out of the plane. Furthermore, some of the strip domains will terminate at one or more of the edges of the platelet, while others, called single wall domains, will be elongated islands.

Applications of a gradually increasing magnetic biasing field parallel to the easy axis causes most of the magnetic moments to flip 180° to align with the common bias direction. Only the moments contained in the elongated island single wall domains remain polarized in the opposite direction and are shrunk into cylindrical form as the field gradually increases. FIG. 1*a* illustrates the natural state of the domains in the absence of a biasing field. FIGS. 1*b*, 1*c*, 1*d*, 1*e*, and 1*f* illustrate the progressive change in domain geometry as the field is increased to a maximum in the range of 10 to 60 oersteds depending upon the particular orthoferrite being used. The resulting isolated cylindrical domains in the crystal 10 such as the typical domain or bubble 11 are dimensionally stable as long as the biasing field remains stable within approximately 10 percent. An increase in applied field strength inverts more magnetic moments to the common bias direction causing a further shrinkage of the domain diameter. Application of an excess biasing field will cause radial instability, resulting in a collapse and disappearance of the domain. On the other hand, as the bias is decreased and the cylindrical domain grows in size, it will eventually reach elliptical instability and revert to serpentine strip form.

The dimensions of a cylindrical domain in a homogenous crystal platelet are predetermined by these limiting radial and elliptical instabilities which in turn are a result of the biasing field, the spontaneous saturation magnetization and domain wall energy of the selected ferromagnetic material, and its thickness and temperature. Each material has an optimum thickness which allows for the largest bias field difference between radial and elliptical instability at a particular temperature. For example, at 300° Kelvin yttrium orthoferrite and ytterbium orthoferrite each with optimal crystal platelet thicknesses of about 80 micrometers can each sustain cylindrical domain diameters of about 80 micrometers. More generally, the bubble domains formed in orthoferrites will fall in the range of 40 to 100 micrometers in diameter whereas in thin garnet crystal films bubbles as small as 8 micrometers in diameter have been observed. The larger bubble size in the orthoferrites permit the use of the hard film control techniques to be described below and greatly facilitate the ease of bubble detection by generating a large signal in the bubble sensing apparatus. Furthermore, the orthoferrites have a natural built-in magnetic anisotropy, they can be Bridgman or float zone grown, and they afford a high signal to noise ratio in detection. They also exhibit lower temperature sensitivity and lower volatility, i.e., sensitivity to extraneous influences such as stray magnetic fields or mechanical force, than do garnet crystals.

Figure 1F:
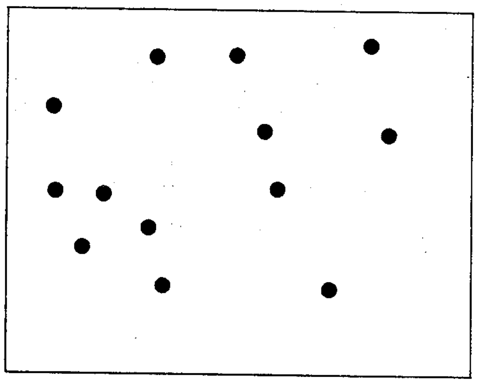
Figure 1B:
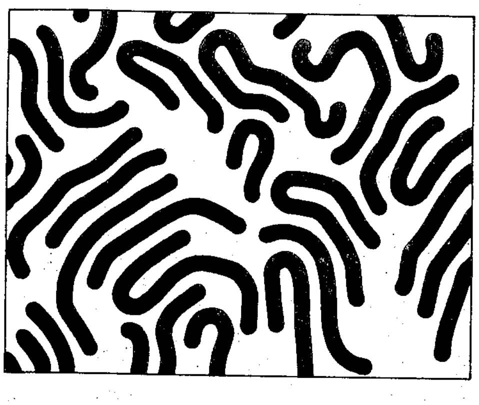
Figure 1E:
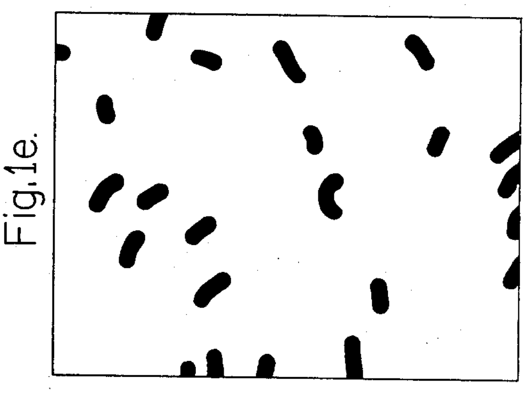
Figure 1A:
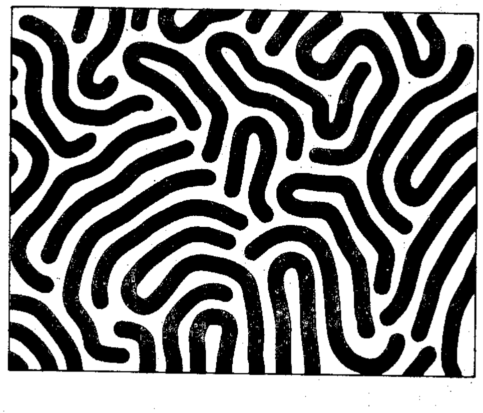
Figure 1D:
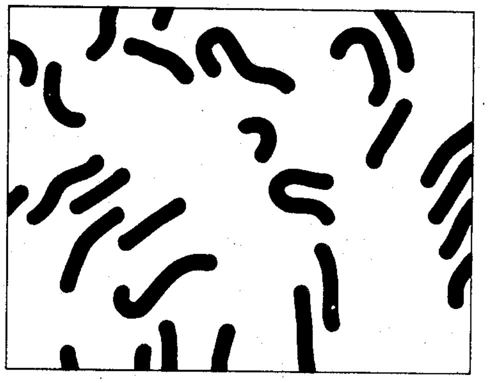

Cylindrical bubble domains such as shown at 11 in FIG. 1f can be moved in any hard direction, that is, in any direction lying in the plane of the major surface of the platelet 10 which is shown as lying in the plane of the drawing with the easy axis of magnetization perpendicular to it. This motion may be induced by the influence of externally applied magnetic control fields. Bubbles have been moved over a distance of one domain diameter in less than 100 nanoseconds. Higher velocities appear to require impractically steep field gradients which can cause a collapse or expansion of the cylindrical domain past its stability limits.

Various techniques for causing such cylindrical domains or bubbles to move along predetermined paths have been discussed in the above noted article by Bobeck et al. These techniques fall into two general types. The first employs conductors in which flowing currents generate the desired fields. This method is called conductor access. The second, called field access, involves immersing the entire wafer in either a pulsating or a rotating magnetic field that acts on the bubbles by means of carefully placed spots of magnetic material that concentrate the field and cause the bubbles to move along paths or to perform other actions determined by the shape and disposition of such spots of magnetic material. Bobeck prefers field access since the conductors he has considered comprise shift register arrays which, when compared to magnetic access shift register arrays are complex, costly and power consuming. The devices described herein use conductor patterns which may be opaque or transparent, but which for the sake of versatility are applied to a separate glass plate which can be positioned adjacent to the ferromagnetic crystal.

Cylindrical bubble domains such as illustrated at 11 in FIG. 1f may be used in a wide variety of signal translating and digital data storage and processing devices by virtue of the characteristics outlined above. For example, there is diagramatically illustrated in FIG. 2 a novel method and apparatus for the analysis of digital data in general and particularly for the subtractive comparison of an unknown signal comprised of unipolar bits with a reference signal also composed of unipolar bits. In the prior art, whenever an unknown digital signal had to be compared with a reference, various parallel or serially iterative processes and devices were employed. These processes and devices suffered from one or more of many different drawbacks such as rigid reference (that is, slow updating of the reference), potential registration and scale problems as between the signal and the reference, bulky devices or systems, and/or devices or systems which did not fail safe since they used a zero output as a signal to indicate a difference. The device diagramatically illustrated in FIG. 2 combines the attractive features of small volume and high bit density, flexibility, rapidly updatable reference, subtractive operation, and fail safe operation due to provision for a positive output difference signal.

Figure 2:
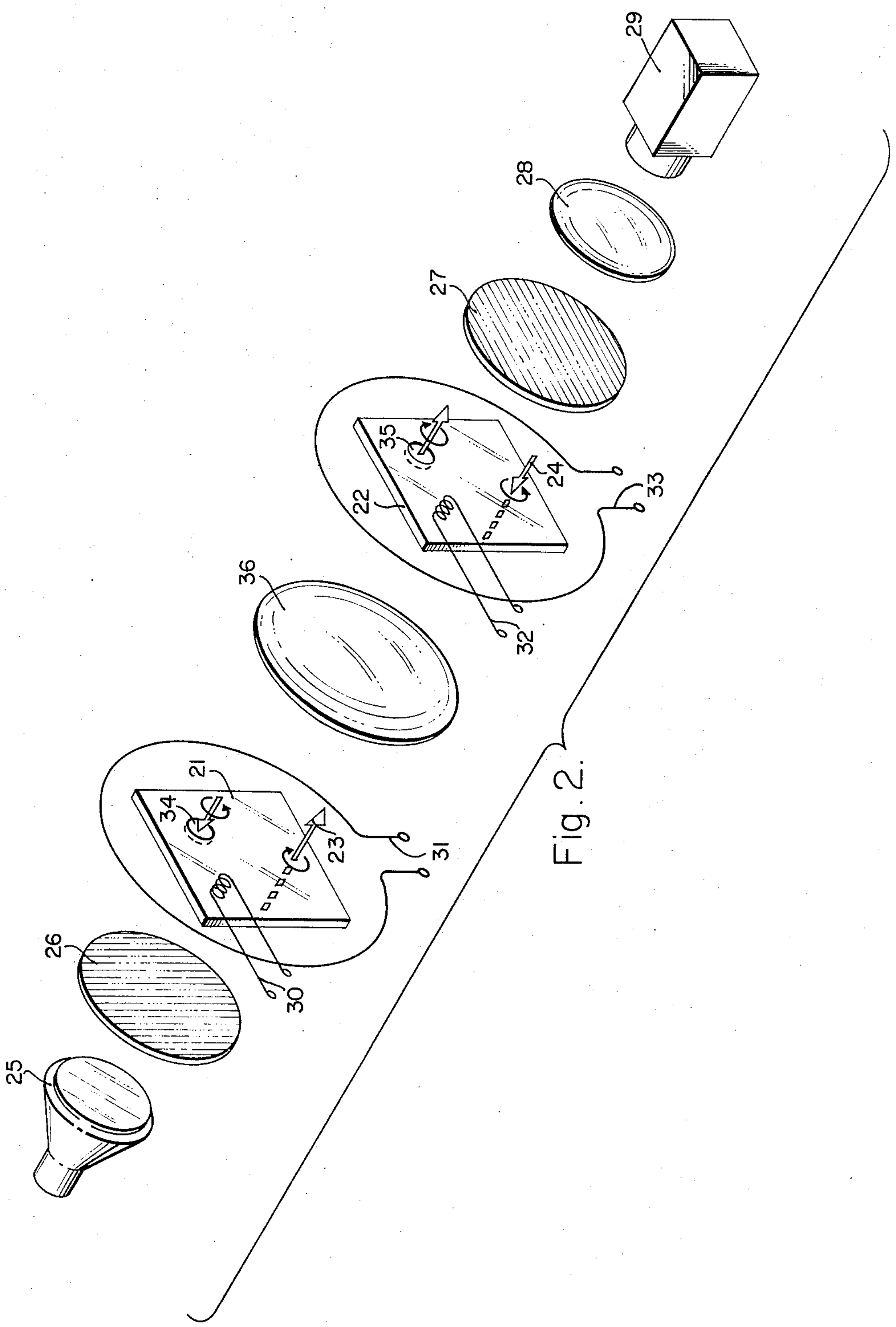
FIG. 2 is a diagramatic illustration of the basic logic involved in using two crystal platelets containing one or more magnetic domains to perform the functions of a logical subtractive comparator for digital data.

In FIG. 2 there are schematically shown two transparent ferromagnetic wafers 21 and 22 which are preferably composed of single crystal yttrium orthoferrite as discussed above and which are magnetically polarized in opposing directions as indicated by the arrows 23 and 24 with a bias field generated from any convenient source. The magnitude of the bias field is of course such as to maintain the cylindrical domains such as those illustrated at 34 and 35 in a stable state.

Light from an incandescent or other source 25 is passed through a polarizing filter 26 and transilluminates the two wafers 21 and 22 which preferably have a relay lens 36 positioned between them so as to project an exact image of the wafer 21 onto the wafer 22. Of course the light source 25 and polarizing filter 26 could be replaced by a laser or any other convenient source of polarized light.

The light emerging from the second plate 22 passes through a second polarizing filter 27 which is functioning as a polarization analyzer and is then collected by a lens 28 and thus directed into one or more photodetectors 29. If a single photodetector is used, a single comparison of all of the information stored in plate 21 against all of the reference information stored in plate 22 will be made by the single detector 29. If a plurality of detectors are used it is possible either to use a corresponding plurality of light beams each being aligned with its respective detector to read a particular quadrant, word, or other segment of the pair of plates in parallel, or to use a single light beam which is focussed to a spot and which scans the various positions of the array of predetermined data bit position in the plate serially or sequentially in a flying spot scanner pattern or in a random mode if desired. A final alternative, of course, is to position a plurality of separate photodetectors such as the detector 29 in alignment or communication with predetermined areas of the pair of plates 21 and 22 and to illuminate the entire surface with a single light beam so as to provide a plurality of individual output signals each indicating the comparison or difference of the particular area of the plate with which it is aligned and all of the signals being available similtaneously or in parallel. Light transmission from individual preselected areas of the plate 22 to separate detectors may, for example, be achieved by replacing lens 28 with a bundle of separate light conducting optical fibers.

The train of signal pulse bits is converted to magnetic bubble domains by means schematically shown at 30 in FIG. 2 and is propagated on a predetermined path or positioned in a predetermined area of the crystal platelet 21 by any of the conventional means indicated in the above noted article by Bobeck et al or, preferably, by conductor positioning means to be described in detail below. The coil 31 in FIG. 2 schematically indicates the propagating and positioning circuitry which positions the magnetic domain 34 at a predetermined position in one of an array of positions on the crystal 21 to represent a single bit of information.

Similarly, the reference signal is converted to domains by means schematically indicated at 32 and these domains are similarly propagated by means schematically illustrated by the coil 33. The magnetic domain 35 is thus positioned to represent a reference bit in a predetermined position on the platelet 22 aligned to correspond to the position of the magnetic domain 34 on platelet 21 in a one-to-one relationship. The correspondence of course requires that the positions be axially aligned and registered with each other along the path of the light beam.

In operation, the polarizers 26 and 27 are mutually crossed for extinction and minimum transparency. Since the Faraday effects caused by the opposing DC bias fields 23 and 24 respectively cancel out no light will pass to the detector 29 when no bubble domains such as domains 34 and 35 have been generated or if they are not in a preselected bit position.

Magnetic domains or bubbles representing the binary value of a bit of a digital signal such as at 34 or representing a bit of the comparison reference such as 35 will have a magnetization polarity opposite to that of the bias fields 23 and 24 respectively and will rotate the plane of polarization of polarized light passed through them as shown by the circular arrows surrounding the straight arrows indicating the magnetic polarity of these respective domains. It will be noted that since the bias fields 23 and 24 have been established to have opposite or antiparallel directions to each other, the magnetic polarity of the cylindrical domains 34 and 35 will also be antiparallel to each other even though in the opposite sense, and will thus produce equal and opposite Faraday rotations of the polarization of light passing through their position in the plates 21 and 22 providing these plates are of equal thickness.

Thus, a magnetic domain or signal bit representation 34 which has no counterpart reference bit 35, or a reference bit 35 which has no counterpart signal bit 34 will locally rotate the plane of polarization and present a light spot on the extinguished background as seen by the photodetector 29. On the other hand, the signal bits which are juxtaposed and compensated by corresponding reference bits will cause no net rotation of the plane of polarization of light passing through both since the rotation caused by signal bit 34 is cancelled out or compensated for by the equal and opposite rotation caused by reference bit 35. It follows that when there is a correspondence of signal and reference bits no light will be transmitted through polarizer 27 and no signal will be generated by detector 29. For each bit position on plate 21 which differs with respect to presence or absence of a magnetic domain from the corresponding bit position on plate 22, an increment of light will be transmitted. Thus, where as shown in FIG. 2 a single detector is used for a single light beam illuminating the entire area of the platelets, the magnitude of the output voltage from detector 29 affords a measure of the number of bit positions wherein the binary digital signal representation does not correspond to the binary digital reference representation.

The truth table for an individual bit position of this device is set forth below and shows the subtractive properties of this magneto-optical comparator. For illustration it is convenient to assume that the presence of a cylindrical domain represents a binary one at a given bit position.

| | Signal Zero | Signal One |
|---|---|---|
| Reference Zero | 0 | 1 |
| Reference One | 1 | 0 |

As will be seen from the detailed physical embodiment techniques to be discussed below, such a device has no registration problems since the positions of the domains can be indexed and predetermined with optical precision and can be exactly superimposed. The comparator can of course be applied to all kinds of code pattern discriminators in any one of the readout modes suggested above. In a limiting case where all of the reference bit signals are in the same state, the comparator becomes in effect a random access memory if means are provided for reading the content of each individual bit position separately. For example, if all of the reference signals are pulsed to a zero state, each output will be zero if the signal bit position is zero and will be one if the signal bit position is one. Using all of the reference bit signals in a one state (bubble present) would, of course, merely reverse the polarity of outputs in the device as shown in FIG. 2. Such a technique may be used to provide inversion where desired.

Figure 11:
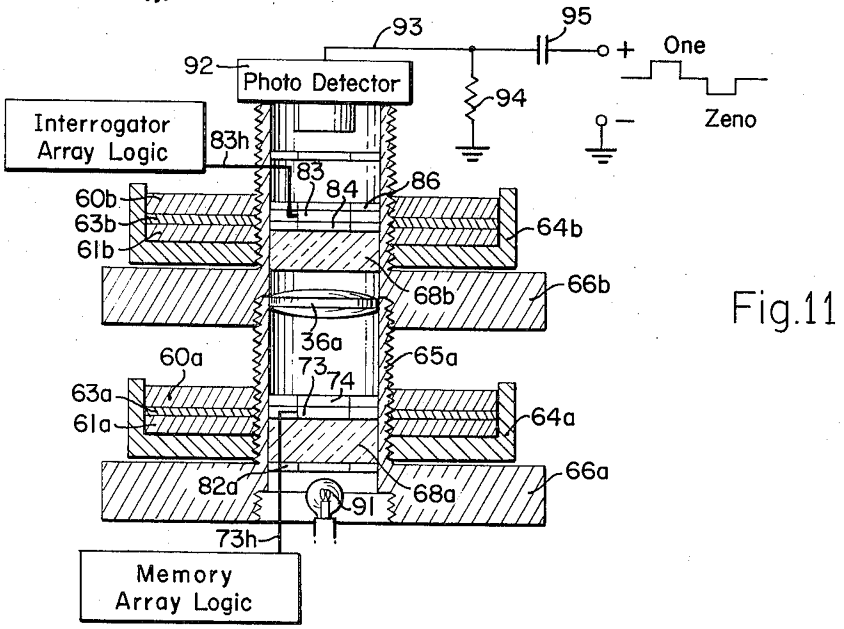
FIG. 11 is an axial sectional view through a device utilizing two ring magnet support members similar to that shown in FIG. 10 in order that two crystal platelet-conductor plate pairs of the type shown in FIGS. 3 and 4 may be combined to afford a logic which results in an electronically address interrogateable random access nondestructive-readout memory.

A preferred physical embodiment of such a device is discussed below in connection with FIG. 11. However, unless a particular memory system has need for incorporating the degree of flexibility available in using a second crystal for interrogation, reference or logic purposes, a less complicated memory device can be fabricated using a perforated mask in place of the second or reference crystal as is shown in detail in FIG. 3. Furthermore, it will of course be obvious that the actual detailed fabrication techniques of the embodiment shown in FIG. 11 are applicable not only to the memory system specifically illustrated therein, but also to the preferred construction of the subtractive comparator illustrated diagramatically in FIG. 2.

Figure 3:
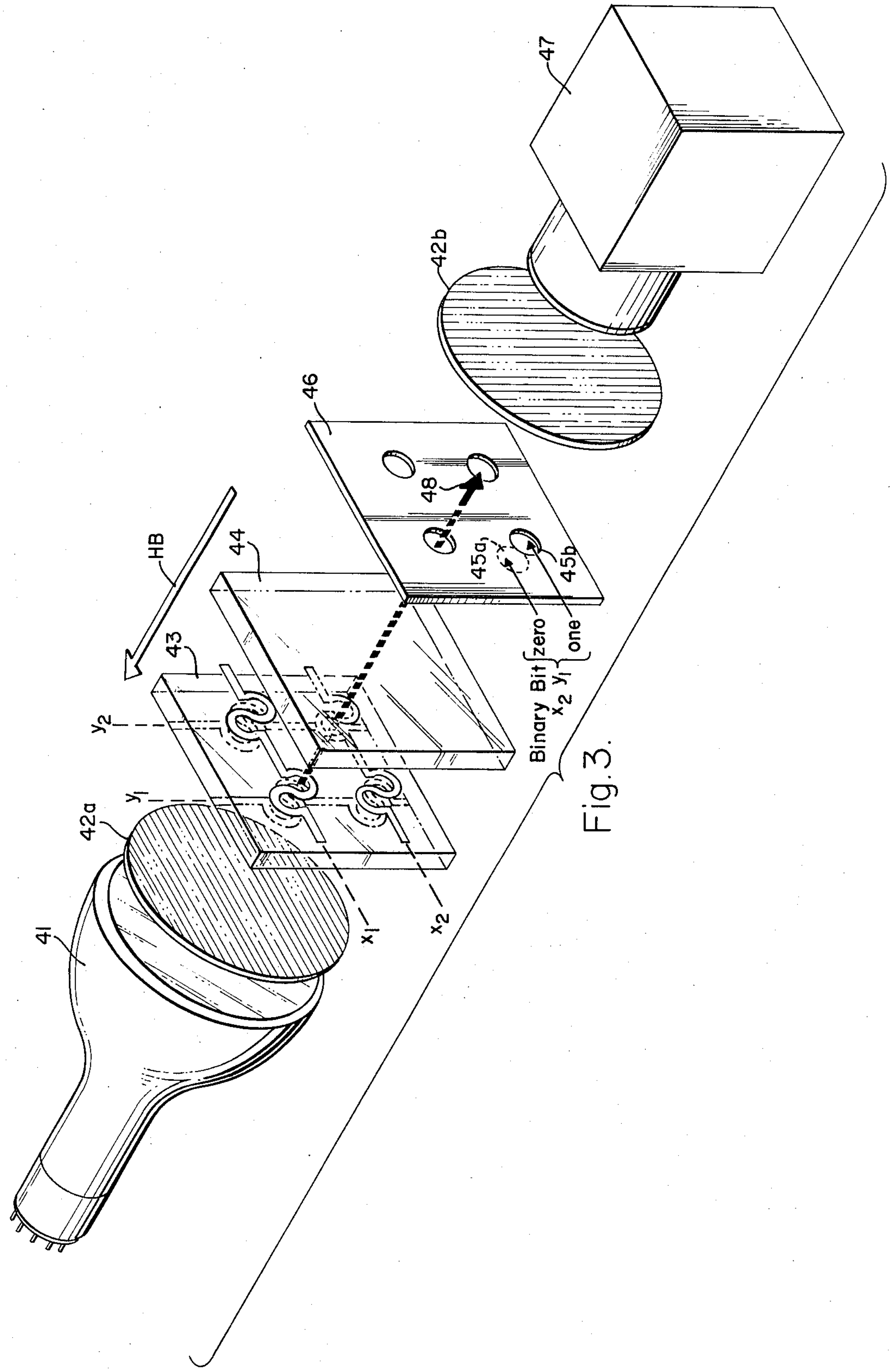
FIG. 3 is an exploded perspective view of the essential elements of a bubble random access memory using one crystal platelet and a mask.

One possible configuration of a nonvolatile, nondestructive-readout memory with random access which can be manufactured by economical microelectronic photolithographic techniques is shown in FIG. 3. This device uses an oscilloscope line scanner 41 which illuminates an array sandwich comprising a glass plate 43 and a crystal platelet 44 with light from a red phosphor using a scan digitally indexed to have the same spacing as the spacing of the conductor members on glass plate 43 the intersections of which define the bit positions in an *x-y* or rectangular coordinate system array. The conductors on the glass plate 43 are so shaped at their intersections as to provide first and second adjacent but separate portions of each bit position defined by the intersection so that the single cylindrical magnetic domain or bubble at each bit position may be shifted back and forth from one to the other of the adjacent portions to afford a representation of a binary zero or a binary one depending upon which portion of the intersection position the bubble is in. The choice of a red phosphor is due to the fact that yttrium orthoferrite crystals from which the platelet 44 is cut as has been discussed above have a transmission peak in the red wavelengths. The beam spot is electronically shaped to have the same diameter as the diameter of the magnetic bubble domains established in crystal 44.

Crossed polarizers 42*a* and 42*b* establish the zero signal extinction while the photodetector 47 monitors the light passing through the array sandwich comprising the glass plate 43 and crystal platelet 44 and the surrounding crossed polarizers 42*a* and 42*b*. The simplest nondestructive readout from such an array sandwich consists of an optical raster scan generated in an oscilloscope 41 which monitors through a perforated mask 46 the Faraday rotation transparency of the crystal platelet 44 at, for example, the binary "one" portion of each bit position.

Of course it will be understood that the glass plate 43, the crystal platelet 44 and the mask 46 are shown in FIG. 3 in exploded relationship and in fact that they would be rigidly positioned immediately adjacent to each other in mounting means so that the bit positions in each are axially aligned to provide a one-to-one correspondence between the bit positions in all other elements. As shown in FIG. 3 the beam of light 48 is passing through the one portion of the bit position defined by the intersection of conductors $x_1$ and $y_1$. On the opaque mask 46 the zero position for the binary bit at the intersection of conductors $x_2$ and $y_1$ is indicated by reference character 45a and is shown in dashed lines since that portion of the bit position is the opaque zero representation area. That is to say, if the magnetic bubble in the crystal platelet 44 is aligned with that portion of the position, the bit is deemed to have a zero value and its effect on polarization rotation will be hidden by the mask. On the other hand, if the magnetic domain at this bit position in platelet 44 is aligned with the portion 45*b*, it will produce an increment of polarization rotation at the alternate site and will therefore cause the light beam to pass through the crossed polarizers 42*a* and 42*b*. It will be recalled that the bias field applied to plate 44 to maintain the stability of all the bubbles in the plate produces a polarization which is just extinguished by the relationship of crossed polarizers 42a and 42b so that the increment produces an incremental change or rotation of the polarization which permits light to pass through the crossed polarizers when the spot scans that position and may thus produce an output signal via analyzer 42*b* and detector 47. It will also be understood that the raster scan is such as to move the spot only from the one portion of each intersection position to the one portion of the next desired intersection position. If the binary bit is a one as indicated by the presence of the bubble in this position, light output will result. If the binary bit is in the zero portion of that intersection position no light output will result indicating a binary zero value for that bit position. The fact that the magnetic domain remains permanently in one of the two subportions of the bit position and merely moves to an adjacent portion of the position makes it unnecessary to restrict the operation of the device to the serial mode as is the case in many prior art devices. That is to say, two or more positions can be read simultaneously by separate spots or other means if desired for logic purposes. Even in serial mode operation, speed of the device is greatly increased since each position may have a read or write function performed merely by applying electrical signals sequentially to the proper conductor pairs. The bubble need only move at most from one portion to the adjacent portion of a single intersection bit position rather than serially through an entire train or path of possible bubble positions.

The showing in FIG. 3 of the plate 43 having only four binary bit positions defined by the intersections of conductors $x_1$, $x_2$, and $y_1$, $y_2$ is of course illustrative only and in practice the number of conductors in the matrix would be greatly increased. It will also be understood that although it is preferred to use a thin glass plate as shown at 43 with all of the *x* conductors on one side of the plate and all of the *y* conductors on the other side of the plate, it is also possible to deposit the entire matrix array pattern directly on one or the two opposite major surfaces of the crystal 44. Where the *x* and *y* conductors are on the same side of either a glass plate or the crystal it is of course necessary to interpose an electrical insulating layer between them which is not shown herein since it is not needed in the preferred embodiment.

Figure 4:
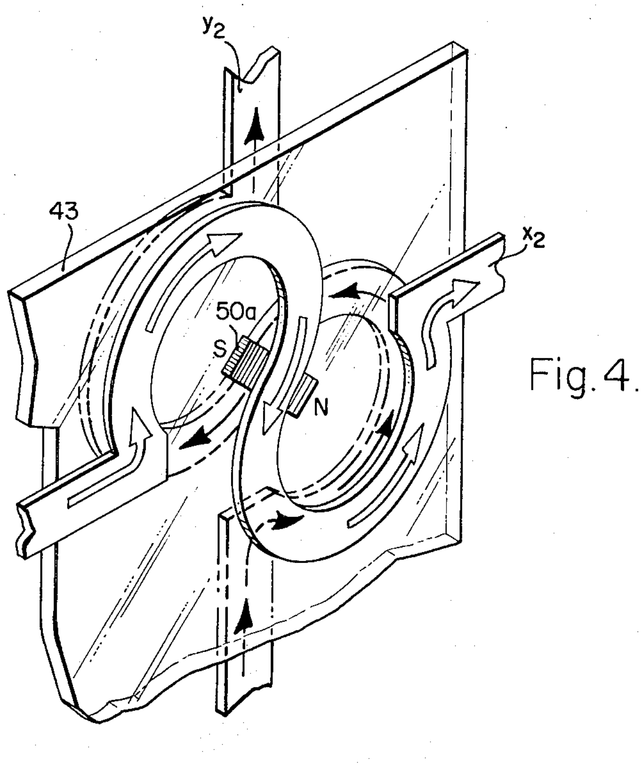
FIG. 4 is a perspective view showing the geometric pattern of arrangement on an insulating transparent subtrate of the conductors and a magnetic latching bar which form the two subportion binary bit position located at each intersection of an array defined by a plurality of *x* and *y* conductors arranged in a rectangular coordinate pattern.
Figure 5:
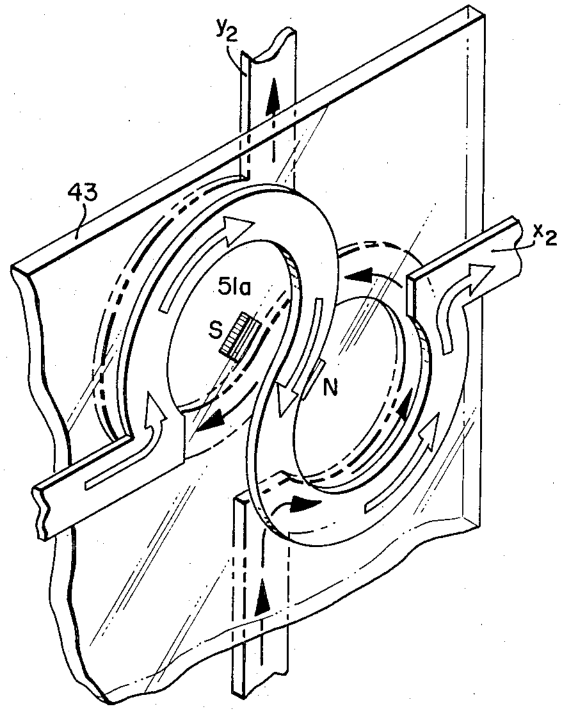
FIG. 5 is a view similar to FIG. 4 but illustrating the variations in current-field logic patterns which may be achieved by varying the position of a magnetic control member.

In FIGS. 4 and 5 there are shown enlarged views of a portion of the glass plate 43 including a typical conductor intersection point defining one binary bit position. The conductor $y_2$ in both views is shown on the rearward side of the glass plate 43 and the conductor $x_2$ is shown on the forward side of the plate. The two views differ only in the relative position of the control member or latching member formed of a material having suitable magnetic coercivity and indicated in FIG. 4 by reference character 50*a* and in FIG. 5 by the reference character 50*b*. It will be noted that in FIG. 4 the magnetic control latching member 50*a* is positioned between the two conductors whereas in FIG. 5 it is positioned in back of the *y* conductor. The possible variations in position of this magnetic latching or control member afford a variation of the logic pattern which may be wired into the memories in a manner which will be obvious to those skilled in the art. In practice the magnetic member 50*a* or 50*b* is preferably composed of a material such as permalloy and is, of course, electrically insulated from the film conductors $x_2$ or $y_2$.

Figure 6B:
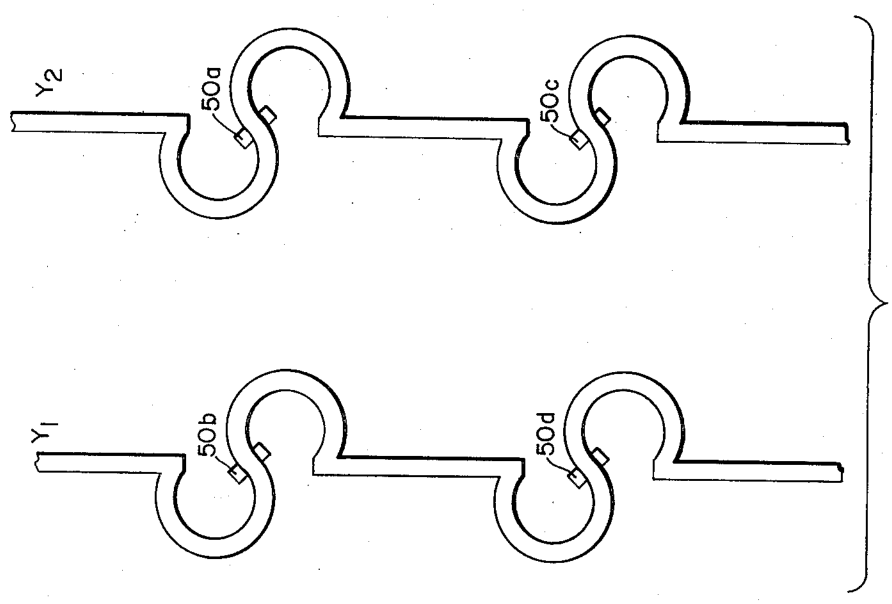
FIGS. 6*a* and 6*b* are respectively geometric plan views of the layout of two typical *x* conductors and two typical y conductors illustrating the relative geometry of the conductors and the necessary spacing between intersections of the array.
Figure 6A:
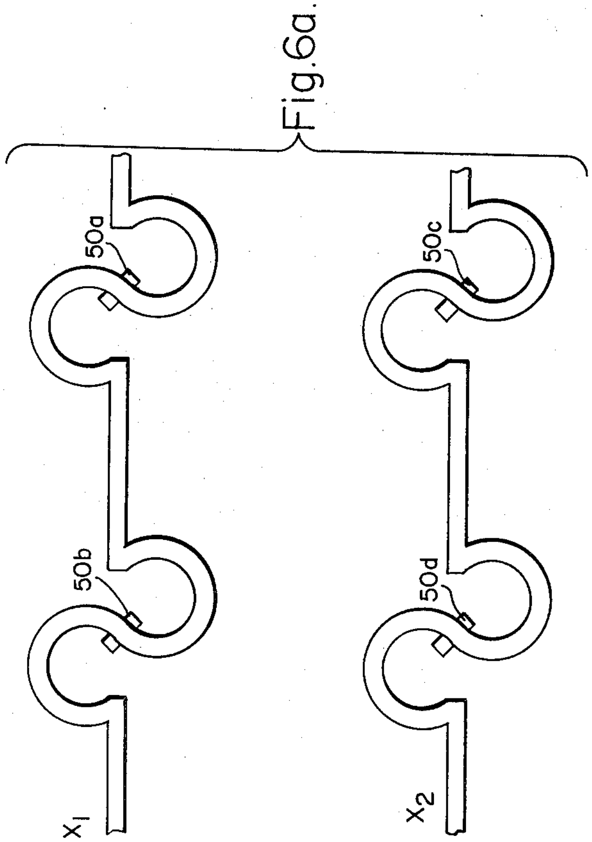

In FIGS. 6*a* and 6*b* there are respectively shown a plan view for the $x_1$ and $x_2$ conductors and of the $y_1$ and $y_2$ conductors shown in FIG. 3. These conductors when positioned as shown in FIG. 3 define four typical single bit locations of the memory and indicate the paths for the two coordinate drive conductors. The remanent permalloy holding film bars 50*a* or 50*b* which in combination with the conductors perform the write and reset functions by moving the cylindrical domains between the two loops at each intersection are positioned at each intersection as discussed above. Both of the conductors and the magnetic bars are superimposed thin film patterns deposited on a transparent substrate such as the glass plate 43. The conductors may, for example, comprise films of copper, silver or gold. The permalloy bars may readily have sufficient thickness to be opaque and still not interfere with the functioning of the device as will be seen below.

Referring again to FIGS. 6*a* and 6*b*, it will be noted that the *y* conductor is formed by taking a mirror image of the open loop figure eight patterned *x* conductor and rotating the mirror image counterclockwise by 90°. The geometry is such as to maintain a center to center intersection spacing at least equal to three domain diameters in order to avoid spureous interactions between magnetic fields at adjacent binary bit or intersection locations. In FIG. 6*a* or 6*b* the center to center distance refers to the distance between the geometric centroid points of the magnets 50*a*–50*b* or 50*a*–50*c* or 50*d*–50*b* or 50*d*–50*c* all of which are equal distances. For example, for a 50 micrometer cylindrical domain 11 such as illustrated above, the center to center distance of this array would be 200 micrometers giving a density of 50 bits per linear centimeter or 2,500 bits per square centimeter. This is equal to 16,000 bits per square inch. Smaller domain diameters would permit even higher bit densities but at the risk of decreasing the signal to noise ratio.

Figure 7B:
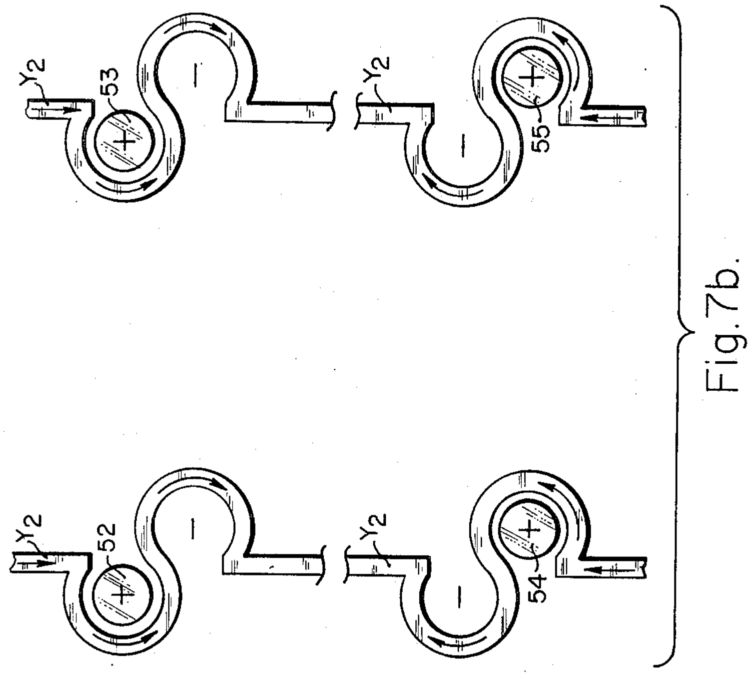
FIGS. 7*a*, 7*b* and 7*c* are diagrammatic illustrations of the four possible logic states which can be defined at any one binary bit intersection position and illustrating the magnetic bubble position associated therewith.
Figure 7A:
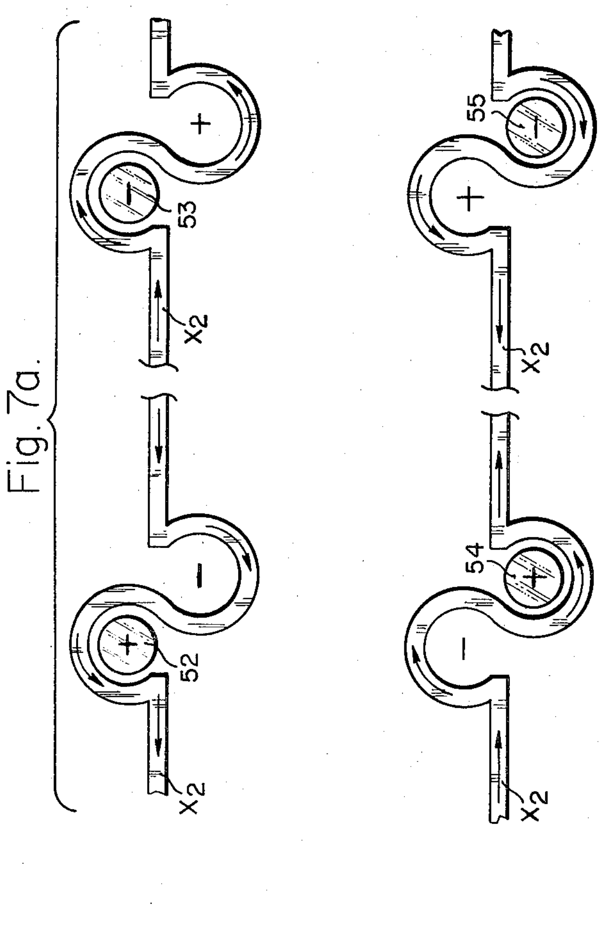
Figure 7C:
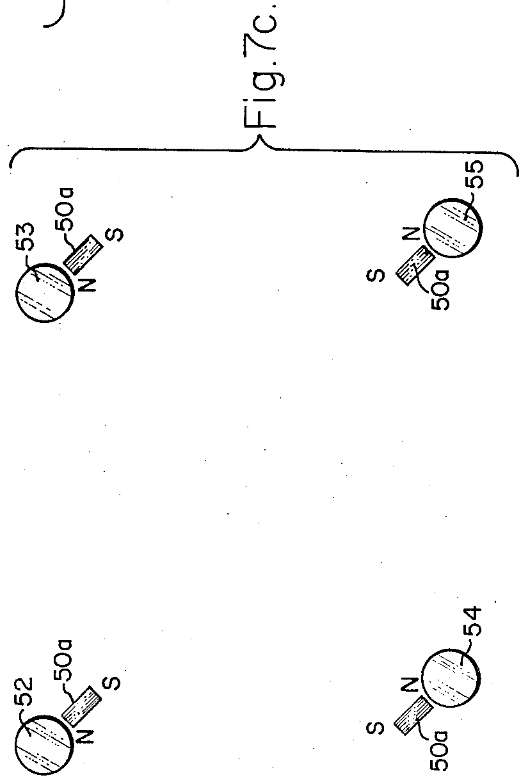

Considering now the showing in FIG. 7*a*, 7*b* and 7*c* it will be noted that the circles within a loop indicate bubble position and that the pluses and minuses in the loops indicate the direction of the magnetic lines of force generated by the current flowing in the direction indicated by the arrow on the conductor loop within which the plus or minus sign is located. Thus, for currents flowing counterclockwise in any given loop, the plus sign indicates that the component of magnetic field generated by that particular current is directed out of the plane of the drawing whereas for currents flowing counterclockwise in any particular loop the associated minus sign indicates that the component of magnetic field generated by that single turn of the loop is directed into the plane of the paper. When the loops formed by the $x$ and $y$ conductors are superimposed in the actual physical embodiment the components of field so produced add vectorially. Each loop, of course, produces a field component H whereas a total field of 2H is necessary to change the polarity of the remanent magnetization of the underlying magnetic bar 50*a* and to thereby move the bubble. The control or latch bars are preferably formed of a magnetic material having high coercivity and square hysteresis loop characteristics. The polarity switching of the bar which requires the coincident flow of two separate currents in the $x$ and $y$ conductors respectively is analogous to the core switching logic now used in ferrite core memory arrays.

Thus, when the bubble is in the position shown at 52 with the currents and field components directed as shown, it will be noted that the field components generated by overlying loops of the $x$ and $y$ conductors are alike and that the two plus components in the loop occupied by the bubble 52 have generated a north pole in the underlying remanent bar 50*s* (see FIG. 7*c*) which serves to hold the bubble 52 adjacent to it even in the absence of current through the conductors. The bubble is thus acting as a sensitive detector of the remanent magnetic polarity in the latch bar. When one line of the $x$ array reverses polarity as indicated by the view in FIG. 7*a* wherein the bubble is in the position 53, it will just neutralize the effects of the unchanged current flowing in the $y$ array but will have no affect on the remanent polarization of the bar 50*a* or on the location of the adjacent cylindrical magnetic domain or bubble. The bubble is thus not moved by a change in polarity of the current in only one of the two conductors at the intersection. However, if both $x$ and $y$ array conductors at an intersection reverse polarity as is illustrated by the view in FIG. 7*a* and 7*b* wherein the bubble is in the position 54, the remanent magnetization of the bar 50*a* will be reversed in polarity and the cylindrical domain will be driven to the alternate position by the combined field of the two arrays and the reoriented field of the magnetic bar. Lastly, the polarity reversal of the conductor from the $x$ array alone will again have no affect on the location of the domain as may be seen by comparing the bubble position shown at 54 and 55.

It can therefore be readily seen that only the simultaneous energization by driving currents of the correct polarity of both the $x$ and $y$ conductors will relocate the cylindrical domain representing the bit of binary information at that position to the adjacent reversal loop by attraction and repulsion of the domain and by reversing the remanent magnetism in the permalloy holding bar. The hard bars also reduce the sensitivity of the bubble domain to crystal imperfections, fluctuations in the external magnetic bias field and to temperature.

It is possible to operate this device without the magnetic latching bars if one uses a crystal which has a built-in general or localized coercivity. Then the bubbles will "stick" and will not move unless the field is in excess of a threshold value. Thus it is possible to make the bubble insensitive to the activation of a half array making it shift only by energizing both the $x$ and $y$ arrays. One can thus eliminate the need for the permalloy bars. In either case, the bubble acts as a sensitive detector for the information stored in the coercive remanence of the hard film permalloy bars or the crystal itself and the coincident energizing of an $x$ and $y$ conductor repolarizes the bar or overcomes the coercivity of the crystal and relocates the bubble at the same time. By selecting bar placement on top, in between (as shown in FIG. 4) or on the bottom of the array (as shown in FIG. 5), it becomes possible to wire in logic into the memory plane in a very simple and economical manner during the manufacturing process since these bar locations can be equivalent to "and," "either," or "neither" logic configurations. Only the in between placement of FIG. 4 is discussed in detail herein by way of example since the logic of alternate arrangements will be obvious to those skilled in the art.

The simplest nondestructive readout consists of the optical raster scan discussed above and illustrated in FIG. 3 which monitors through the perforated mask 46 the Faraday rotation transparency of the crystal platelet at the one position 45b with which the holes in the opaque mask are aligned.

When the foregoing conductor array is used in the fabrication of a subtractive comparator of the type diagramatically illustrated in FIG. 2, it will of course be understood that the mask 46 is replaced by a second conductor array-crystal assembly so that both signal information and reference information may be read into the device in the preferred manner specifically indicated above and read out by spot or floodlight illumination or any combination thereof, as desired from a particular application.

The entire memory of the device shown in FIG. 3 can be reset by proper energization of a reset coil enveloping the platelet sandwich and positioned to generate a field directed axially along the hard bars. A current added through this winding which is orthogonal to the bias field will generate an in plane field which will shift all the bubbles and the hard bars to their zero condition.

Alternate sequential or random access nondestructive readout schemes include electroluminescent diode arrays as light sources, fiber optics as input and output light conduits and microminiaturized photodiode arrays or vidicon or image converter tubes as detectors. More particularly, when two or more such platelets are transilluminated in series to form complex three dimensional random access memory and correlation functions it has been found preferable to achieve the series transillumination by interposing either fiber optics or relay lenses between the individual crystal platelet-glass plate sandwiches to eliminate magnetic interaction between the domains. The glass plate 43 and the crystal of each sandwich, however, are preferably positioned in immediately adjacent contact with each other in the construction of actual physical devices. Of course, the nonmagnetic mask 46 should also be positioned immediately adjacent to the output crystal platelet 44 shown in exploded relationship in FIG. 3.

Figure 8A:
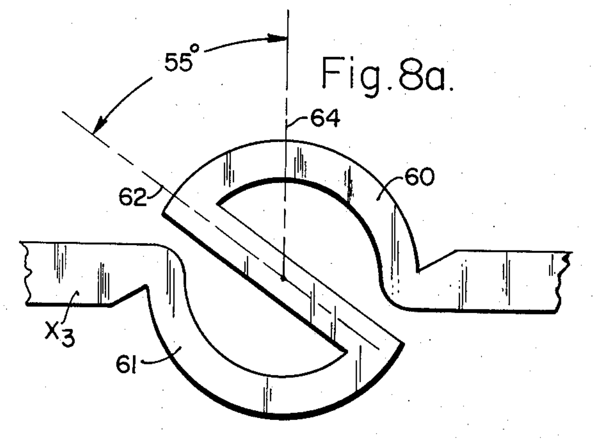
Figure 8B:
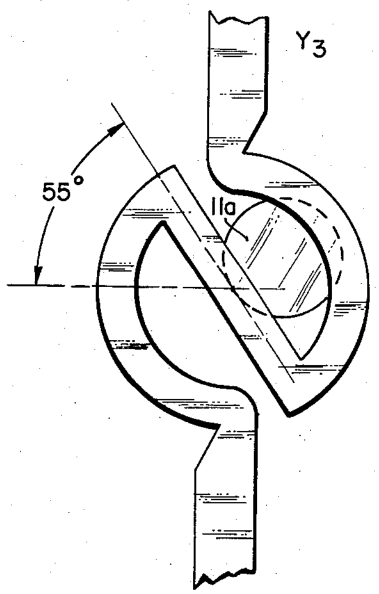
Figure 8C:
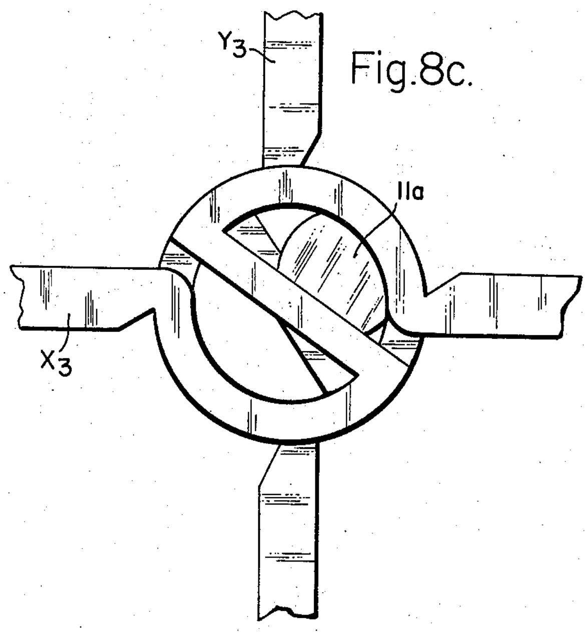
FIG. 8*c* is a composite of FIGS. 8*a* and 8*b* showing the conductor pattern resulting from an overlay of FIGS. 8*a* and 8*b*.

An alternate conductor pattern for the loops at the intersections in any of these devices is shown in FIGS. 8*a* and 8*b*. In FIG. 8*a* the conductor $x_3$ has a configuration such that an upper loop 60 and a lower loop 61 are connected by a central straight portion 62 which makes a preferred angle of 55° with the line 64 which is the vertical construction line passing through the center of the intersection which is also the common intersection point of the axis of the horizontal conductor $x_3$ and the straight slanted portion 62. The conductor $y_3$ shown in FIG. 8b is again derived from the conductor $x_3$ by taking its mirror image and rotating it through an angle of 90° in the counterclockwise direction. The dimensions of the bubble being used relative to the loop formation may be seen in FIG. 8b where bubble 11a is illustrated as being contained within the right hand or upper loop. In this configuration for the drive conductors the principle of operation remains unchanged. However, this modification has the additional features of simplified drafting and more positive confinement of the bubble in either half loop. The angle of 55° shown in the Figures is determined by the width of the diagonal bar and the inner diameter of the pattern circle. The magnitude of this angle is such that the two diagonal bars just barely overlap at their ends thereby completely closing the conductor loop field generating patterns geometrically as may be seen in FIG. 8c. FIG. 8c is a plan view showing the superimposed configuration of the conductor $x_3$ of FIG. 8a and the conductor $y_3$ of FIG. 8b and also including the representation of the diameter of the bubble domain 11a as confined in the upper loop which is fully closed by the overlap of the respective diagonal bars 62 of the $x$ and $y$ conductors. Of course it will be understood that the permalloy bar for latching the bubble in position of one or the other loop portions can also be used with this conductor configuration and is positioned across the intersection point of the two diagonal bars in a manner entirely analogous to its positioning in the configuration shown in FIG. 4.

In the actual fabrication and assembly of these devices it is sometimes desirable to use permanent ring magnets to establish the biasing fields rather than to use coils as has been common in the past. In the prior art, whenever it was desired to set up the magnetic bias conditions for the formation of bubbles in a crystal platelet, a controlled electrical current was passed through a coil surrounding the platelet. Such an arrangement is bulky and complex, is subject to joule heating, and is prone to failure due to unanticipated current interruptions. It is therefore preferred to take advantage of the zero field region which exists between two opposing ring magnets to provide the desired feature of flux adjustability and polarity reversal.

Figure 9:
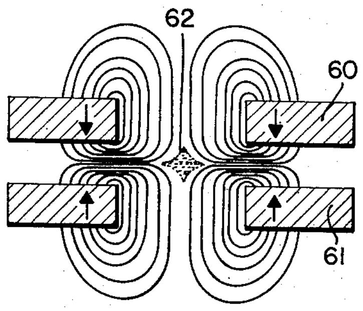
FIG. 9 is a diagrammatic illustration of the magnetic field pattern resulting from a pair of ring magnets useful in construction of devices as described herein.

FIG. 9 is a diagramatic sectional view illustrating the magnetic field pattern of two such opposing ring magnets. It will be noted that the field lines surround a zero field region in the center which is shown by cross hatching. That is to say, the sectioned ring magnets 60 and 61 generate fields (as indicated by the field lines) having the directions indicated by the arrows and surround a central region of zero field indicated by the cross-hatch area 62. A nonmagnetic support platform holding a crystal platelet in this field free zone is thus not exposed to any bias field. By changing the relative axial positions of the support platform and the ring magnets, either by holding the magnets steady and moving the support platform or alternately, by holding the platform steady and elevating or lowering the ring magnets, one can select any bias level desired and by choosing whether the motion has one direction or the other can furthermore select any polarity desired. The zero field zone also appears adjacent to single ring magnets and can be similarly employed if it is desired to change the field from zero to maximum in one polarity only.

Figure 10:
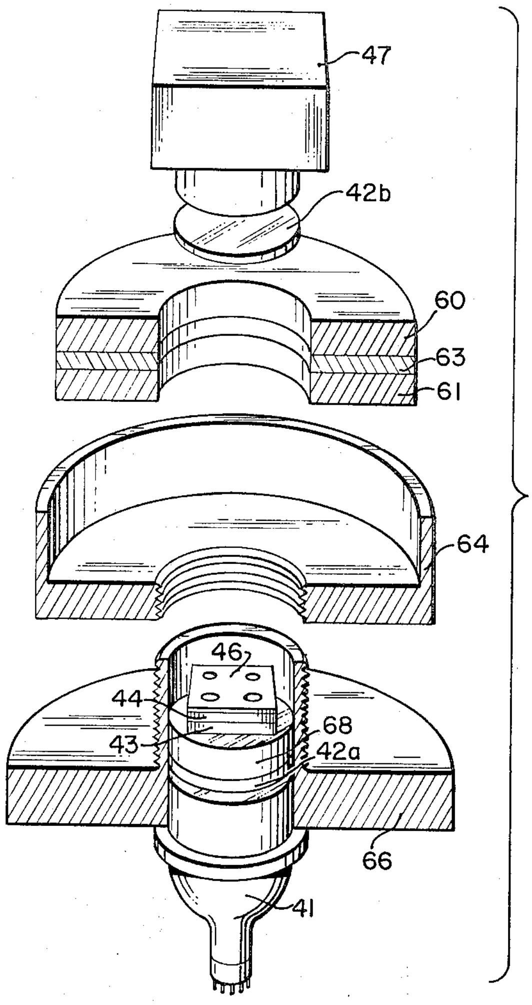
FIG. 10 is an exploded perspective view, partly broken away in section, showing one way in which a supporting housing and bias field generating arrangement can be achieved for the manufacture of devices as described herein.

In FIG. 10 a biasing stage utilizing this principle in a manner suitable for actual construction of a device such as illustrated in FIG. 3 is shown in cut away perspective and having certain of its parts in exploded relationship. Thus, in FIG. 10 the ring magnets 60 and 61 are bonded to opposite sides of a nonmagnetic spacer member 63 in magnetic repulsion alignment. The sandwich thus formed is seated in a nonmagnetic elevator cup 64 which is internally screw threaded at a central hole to be reeived onto an externally threaded nonmagnetic tube 65 which is in turn fastened to a nonmagnetic base plate 66. Threaded motion of the cup 64 along the axial length of the tube 65 thus provides the elevation mechanism of the field of the ring magnet with respect to the top surface of a transparent glass plug 68 which provides the supporting stage for the crystal platelet or crystal platelet sandwiches of any particular crystal or crystallographic device under consideration. The magnetically shielded oscilloscope tube 41 shown in FIG. 3 having the first polarizer 42a attached immediately to its face is insertable into one end of the tube 65 which seats on a gasket on the tube 41 so as to position polarizer 42a immediately adjacent to the lower surface of transparent supporting plug 68. Assuming that we are interested in providing the biasing field $H_B$ of the device of FIG. 3 in this fashion, then the glass platelet 43, the crystal platelet 44, and the mask 46 would be stacked in permanently fixed relative alignment to each other and to the oscilloscope and are positioned as shown on top of glass plug 68. The input and output conductors to the array, on glass plate 43, although not shown, may be conveniently brought out of the top of tube 65 at the side thereof so as not to interfere with the axial transparency of the tube and are provided with any convenient magnetic shielding so as not to alter the desired magnetic field. The second polarizer 42b and the detector 47 are then positioned in axial alignment to receive light transmitted through the tube and are supported in any convenient manner. Of course it will be understood that the pair of ring magnets can be supplemented or replaced either by additional pairs, by one or more single ring magnets, or by electrical coils if desired in the design of any particular apparatus. Furthermore, where relay lenses are required, they can of course be positioned and conveniently supported within a tube such as tube 65 in any convenient manner as is well understood to those skilled in the optical arts.

One additional feature in the practical construction of a device such as shown in FIG. 3 relates to the technique used to obviate the need for serially operated bubble generators of the type discussed by Bobeck. During the manufacture of memory and logic devices of the type shown in FIG. 3 which employ many uniaxial cylindrical domains as "bits" in each of the permanently wired bit positions, it is necessary to initially insert these domains into the array of magnetic or electromagnetic holding and processing circuits. In order to accomplish this, it is preferred to split the antiparallel meandering domains such as shown in FIG. 1a which occur naturally in uniaxial magnetic crystal platelets and which are always present when no external bias is applied and are caused by the magneto crystalline anisotropy of the crystal.

By establishing a pulsed or alternating magnetic bias field parallel to the easy axis of the crystal, that is to say, in the crystal and orthogonal to the plane of the crystal as shown in plan view at 10 in FIG. 1, the domain walls can be churned and broken up so that when a uniaxial biasing field is superimposed along the easy axis, a large number of cylindrical domains are formed. The uniaxial biasing field along the easy axis may be provided by the permanent ring magnet assembly shown in the apparatus of FIG. 10. The pulsed magnetic bias field parallel to this field and to the easy axis of the crystal may be provided by a considerably larger external electromagnetic coil in which the entire mounting 66 is positioned before insertion of the oscilloscope 41 therein.

The array is then filled by activating the bit holding circuits, that is to say, by applying electrical currents through the *x-y* conductors such as those shown on the glass plate 43 in FIG. 3. Activation of the bit holding circuits attracts the nearest neighboring cylindrical domain bit into each holder. To clean out the undesired excess domains between the bit holder circuits at each matrix intersection, it is necessary to increase the bias field along the easy axis to domain collapse strength while the domains in the holders are protected by a localized reverse compensating field generated by the holder conductors' current. This reverse directed clean-out field may be generated by either appropriate motion of the ring magnet assembly or by supplementing it with an external magnetic coil which is removed after the completion of this manufacturing step. Once the appropriate bubbles have been inserted they are held in cylindrical stability by the permanent ring magnets.

The initial insertion of the cylindrical domains into the crystal by this method is thus carried out by means of permanent magnets or sets of coils which can be located under a Faraday rotation inspection microscope. The array is filled by activating the orthogonal churning field, the easy axis domain forming field, and the localized array holder fields in the sequence indicated above while manipulating the realtive field intensities to assure by visual inspection that the cylindrical domains exist at each of the holder circuits formed at the intersection points of the array and only at these desired locations. It is thus seen that filling of the memory array proceeds rapidly and in parallel and that the domains once established are held in the stable state by the field of the permanent biasing magnet arrangement from the ring magnets 60 and 61. The latching bars when suitably polarized can similarly hold on to the newly generated bubbles. Alternately, localized sites with increased crystal coercivity can aid in this domain injection process. If the visual microscope inspection exposes any unfilled positions, the sequence of field generation can of course be repeated if necessary. Once each of the intersection positions has been provided with its magnetic domain, the polarization analyzer 42*b* and the detector 47 can be mounted into position and the array holder circuit leads can be brought out through the side of the upper portion of the tube 65 and connected to any desired or suitable logic circuitry of any known type now used in the art.

It will also of course be understood that the glass plug 68 is shown supporting the plate 43-crystal 44 sandwich and its associated mask 46 in the relation illustrated in the device of FIG. 3 for purposes of example only. The elements indicated for a device of the type shown in FIG. 2 could equally well be contained in tube 65 and it will be immediately apparent to those skilled in the art of design of logic circuitry how many other related devices using one, two, three or more cyrstal platelet sandwiches can be fabricated to meet the needs of a particular application.

Once a unit such as shown in FIG. 10 has been manufactured and assembled, that is to say, once the cylindrical domains have been established at the intersections of a crystal platelet which is mounted within the supporting member 66 and is being held in a magnetic steady state by the surrounding ring magnets 60 and 61, a plurality of units may be stacked in axially aligned relationship as shown in FIG. 11 if it is desired to obtain more complex logic function than can be achieved with a single platelet.

For example, in FIG. 11 there is shown a random access electronically address-interrogable memory array utilizing a first crystal platelet 74 and associated conductor patterns bearing glass plate 73 (which are similar in all respects to the sandwich pair 43–44 shown in FIG. 3) and a second such sandwich pair comprising a crystal platelet 84 and a glass conductor pattern plate 83. The ring generated biasing fields for these two pairs are oppositely directed in a manner analogous to fields 23 and 24 in FIG. 2. The first sandwich is positioned on a glass block 68*a* similar to the glass block 68 of the unit shown in FIG. 10. The second sandwich pair is positioned on a glass block 68*b* in a second unit also similar to the unit shown in FIG. 10. The structure of the two mounting units is in other respects also similar to that shown in FIG. 10, except as noted below, and corresponding parts are indicated by the same reference character to which a suffix A has been added for the lower most unit in FIG. 11 and to which a suffix B has been added for the corresponding element in the upper unit of FIG. 11. The only difference is that the parts are now shown in assembled relationship and that the interior bore of the base plate members 66*a* and 66*b* has been dimensioned and threaded to receive the external thread on the tube members of another unit so that a plurality of the units may be assembled in stacked relationship as shown. The glass plates 73 and 83 and the crystal platelets 74 and 84 are shown mounted in opaque ring frame members which may be used to position them rigidly within the tube in any convenient manner. The device also includes a mask 86 which is analogous to and functions in the same manner as the mask 46 in the device of FIG. 3. The crossed polarizers 82*a* and 82*b* corresponding to the crossed polarizers 42*a* and 42*b* of FIG. 3 are also mounted within the tubes.

Magnetically shielded harness wiring of the array leads from the glass plate 73 may be brought down through a hole in the glass plug 68 and connected to external memory array logic of a type currently in use in connection with magnetic core memories. Similarly, a magnetically shielded wiring harness leads the wiring from glass plate 83 through the mask 86 and out the side of tube 65*b* to be connected to interrogator logic for a reason to be explained in detail below. Harnesses 73*h* and 83*h* are shown in FIG. 11.

The device functions similarly to the comparator of FIG. 2 in that an incandescent light source 91 transmits light through the first of the pair of crossed polarizers 82*a*, through the glass block 68*a* through conductor pattern bearing glass plate 73 and crystal platelet 74 through a relay lens 36a which, like the lens 36 in FIG. 2, projects an image of the sandwich pair 73–74 through glass block 68b onto the second sandwich pair 83–84. Light is then transmitted through mask 86, the second of the pair of crossed polarizers 82b and into the photodetector 92.

The device as shown in FIG. 11 is interrogated by electrical signals applied to the second glass plate 83 rather than by positioning of a scanning spot as was the case in FIG. 3. Therefore the incandescent light 91 illuminates the entire plate surface and the detector 92 senses total output from the second sandwich pair combination. Output from photodetector 92 is applied over conductor 93 to a grounded resistor 94. Signal is taken across resistor 94 through a blocking condenser 95 and is read between output terminals 96 and the ground terminal 97.

For reasons which will be explained below the steady state value of the electrical output of the photodetector in the absence of any signal from the interrogator logic is a DC current the magnitude of which is determined by the binary signals contained in the total memory and/or by a bias light of fixed value if desired. The logic of the functioning of the device is such that a signal addressed by the interrogator logic to an interrogator array position moves a bubble away from the mask hole covering that position and thereby produces an incremental positive going pulse on this steady state output if the memory unit contains a bubble (indicating a binary one) at that position, and an incremental negative going pulse on the steady state output if the memory unit contains a bubble alternately positioned to indicate a binary zero at that position.

The fact that this will be so can be seen by considering the device of FIG. 11 in comparison to the devices of FIGS. 2 and 3. Like the device of FIG. 2 the permanent bias field for the sandwich pair 73, 74 is directed upwardly or away from the light source as is the field 23 in FIG. 2. Similarly, the bias field for the sandwich pair 83 and 84 is directed in an antiparallel fashion toward the light source as is the bias field 24 in FIG. 2. The two plates are coupled by a relay lens 36a which functions as does lens 36 in FIG. 2. The two single platelets at 21 and 22 of FIG. 2 have of course been replaced by two glass plate-crystal platelet sandwich pairs of a design similar to the pair at 43 and 44 in FIG. 3. Unlike the device of FIG. 3, however, a second sandwich pair is used in addition to the mask 46 rather than replacing the second platelet 24 of FIG. 2 by the mask 46 of FIG. 3. In this second sandwich pair 83, 84 the normal position of the magnetic bubble in the quiescent state when the memory is not being interrogated is in the loop portion of each intersection position which is positioned under the open hole in the mask 82b which would correspond to the hole position 45b in the mask 46 of FIG. 3. This has been and for convenience will be continued to be identified as the one position. Corresponding positions of aligned intersections in the memory sandwich pair 73–74 are of course utilized to indicate in a one-to-one correspondence fashion the presence of a binary one or a binary zero at each intersection in accordance with which of the two loops the magnetic bubble occupies.

Recalling the operation of the device of FIG. 2 and further recalling that the normal position for the bubbles in the interrogator plates is in the one position, it will be seen that if all of the binary bit positions of the memory pair are filled with representations of ones, all of the bubbles will be axially aligned and will produce opposite polarization rotations due to the opposite direction of biasing fields as explained in connection with FIG. 2. Thus, when two bubbles are sequentially aligned with the hole in the mask no light will be transmitted. Only memory signal light can pass since the path inside the tube is otherwise blocked by opaque frame members and the like. Such a state of no output indicates no difference between the two plates, hence all binary ones in the memory.

If now, however, any one of the binary bit positions in the interrogator pair 83–84 is queried by electrical signals from the interrogator logic which moves the bubble to the zero portion of this position, a difference will exist between the bubble location for that binary bit position of the interrogator pair and that of the bubble in the memory pair and light will be transmitted to the photodetector producing a positive going output pulse from the capacitor 95 and indicating that a one is contained at that particularly addressed or queried location in the memory pair. Suppose, however, that all of the memory positions contained a one representation except that one particular position which then necessarily contained a zero. In that event, the quiescent output of the system would be a DC signal representing just the light transmitted by that single zero representation since in the quiescent state a difference would exist between the memory plate and the interrogator plate bubble locations. If now, however, that array position is interrogated by moving the interrogator plate bubble to its zero position, a difference no longer exists and that increment of light is prevented from reaching the photodetector. The zero representation at that memory position is therefore indicated by a negative going output pulse at the output of capacitor 95.

Consider now the opposite case where all of the memory positions are occupied by zeros. All of these positions will then be transmitting light since all of the interrogator positions in the quiescent state are in the one condition producing a difference and therefore having light output at its maximum value. If now any one of the interrogator pair of bubbles is moved to its zero position, the difference no longer exists, an increment of light is blocked from transmission to the filter-detector and a negative output pulse occurs indicating that a zero was located at that memory position. If however that particular position is the only one in the memory array which has a one, all the others being zero, the steady state photodetector output will be reduced just by that small increment so that when that position is queried by the interrogator a positive going pulse will result indicating the presence of the lone one at that memory location.

To reduce the DC component of the photodetector signal it is possible to sensitize the photodetector circuitry by a pulse which coincides with a pulse pair in the $x$ and $y$ arrays of the interrogator array. Thus the photodetector is then "blind" between interrogations. Any synchronous detection scheme can be employed for this purpose.

It should also be noted that in fact the mask 82b is not essential to the logic of the device of FIG. 11 as described above, but is preferably used in order to reduce reflected light and electrical noise. The polarization compensation logic discussed for one bubble position above is similar for the adjacent positions which are exposed if the mask is removed. Hence the logical results are unchanged since the similar outputs or non outputs merely reinforce each other. The FIG. 11 device is thus in reality merely a detailed physical embodiment of the device of FIG. 2.

Finally, it should be noted that any or all of the optical interrogation or detection schemes discussed in connection with FIGS. 2 and 3 can be used separately or in combination with the electronic interrogtion shown in FIG. 11 in order to provide gating or logic functions as desired. Thus, if the flying spot scan is used in combination with electronic interrogation to read $x_n y_n$ the device functions as a three input AND gate, the three inputs being first memory bit content at $x_n y_n$ plus two simultaneous interrogations, one optical and one electronic.

It is thus seen that the devices described herein afford a considerable flexibility to the electronic circuit designer and may be used in many different logic combinations and networks.

Finally, it should be noted that the contrast reducing effects of optical birefringence, present in some magnetic crystals such as orthoferrite, which occur under monochromatic illumination and at certain platelet thicknesses can be reduced by selecting a suitable range of wavelengths for the transilluminating light.

What is claimed is:

1. A magneto-optical signal translating device for binary digital signals comprising:

a. first and second optically translucent uniaxially anisotropic ferromagnetic crystal platelets of equal thickness, one of the major plane surfaces of each of said platelets being juxtaposed in light transmitting relationship to a major plane surface of the other of said platelets, and each of said platelets having an easy axis of magnetization perpendicular to the plane of said major surface of said platelet;

b. means to magnetically bias said first and second platelets respectively in opposing polarities along said easy axes of magnetization so that their respective Faraday rotations will normally compensate each other;

c. means to transilluminate and optically superimpose in registration said pair of platelets with a beam of polarized light;

d. means to establish at least one movable cylindrical magnetic domain in said first platelet having a magnetic polarity antiparallel to the direction of said magnetic bias for said first platelet and means to establish at least one cylindrical magnetic domain in said second platelet having a magnetic polarity antiparallel to the direction of said magnetic bias for said second platelet, said magnetic domains respectively representing the binary value of one bit of a digital signal and of one bit of a digital reference to which said digital signal is subtractively compared;

e. polarization analyzer means positioned to receive light transmitted through said pair of platelets to detect any uncompensated change in the state of polarization of said light produced by its transmission through said platelets; and f. light transducing means positioned to receive light transmitted through said polarization analyzer to produce an output indicative of said detected uncompensated change in the state of polarization.

2. In a digital signal translating device:

a. a crystal platelet of a type capable in the presence of a magnetic biasing field of sustaining moveable magnetic domains therein;

b. means to establish in said crystal a magnetic biasing field having a direction and magnitude operative to sustain such magnetic domains;

c. signal responsive means for moving one of said magnetic domains only alternately from one to another of at least two predetermined subportions of each of a set of predetermined positions in said crystal, said means comprising first and second sets of conductors, one conductor of each of said sets passing in magnetically coacting relationship to each position of said set of predetermined positions, each of said conductors having a reversing double loop portion at each of said positions, one of said loops being positioned to magnetically coact with one of said subportions of said position and the other of said loops being positioned to magnetically coact with the other of said subportions of said position, said two loop portions being connected to form a single conductive current path with the rest of said conductor and being oriented so that the magnetic field generated by a current in said conductor will tend to move said bubble from the first of said subportions to the second of said subportions for one polarity of current flow and to move said bubble in the opposite direction from said second subportion to said first subportion for the opposite polarity of current flow;

d. means to permanently retain in said crystal a fixed number of said moveable domains at each of said predetermined positions for movement only between the subportions of said position; and e. means to detect the position of said moveable magnetic domain.

3. In the fabrication of a magneto-optical translucent translating device utilizing an optically transucent uniaxially anisotropic ferromagnetic crystal platelet having its major plane surface cut perpendicularly to the easy axis of magnetization, a method of generating a coexisting plurality of such cylindrical magnetic domains comprising the steps of:

a. applying an alternating magnetic field parallel to said easy axis of the crystal and in the crystal orthogonal to the plane of the major surface thereof to break up the walls of the magnetic domains that naturally occur therein;

b. establishing an uniaxial constant magnetic biasing field along said easy axis of said crystal to form cylindrical magnetic domains therein;

c. attracting one of the plurality of cylindrical domains so formed to each of a plurality of permanently defined domain retaining positions in said crystal; and d. destroying the excess domains not associated with one of such positions by increasing the bias field along said easy axis to domain collapse strength while the domains in the permanent positions are protected by a localized reverse compensating field.

4. A digital signal translating device comprising:

a. an array of first and second sets of conductors, the conductors of said first set insulatively intersecting the conductors of said second set in magnetically coacting relationship thereto to form a plurality of intersections, each of said conductors in each of said sets having two separate but contiguously positioned and electrically continuous loops forming a single reversing double loop portion at each of said intersections, the direction of the magnetic field generated by a flow of current in a given direction in one of said loops being opposite to the direction of the magnetic field generated by the flow of said current in the contiguous electrically connected loop, the loops in the two conductors forming each intersection being positioned with respect to each other so that each of the loops in one conductor is in magnetically coacting relationship with one of the loops in the other conductor;

b. a sheet of magnetic material having moveable magnetic domains therein, at least one domain being operatively associated with each of said intersections so as to be moveable into magnetically coupled relationship with one or the other of said loops of each of the conductors forming said intersection in response to the coincident flow of currents of predetermined polarity in said two conductors; and c. means for detecting the position of said moveable magnetic domain at said intersection.

5. A digital signal translating device comprising:

a. a uniaxially anisotropic ferromagnetic crystal platelet having its major plane surface cut perpendicularly to the easy axis of magnetization of said crystal and being capable in the presence of an externally applied magnetic biasing field of sustaining movable cylindrical magnetic domains having their cylinder axes lying along said easy axis of magnetization;

b. means to define an array of predetermined positions in said crystal, each of said predetermined positions being one of a plurality of contiguous domain retaining areas defined at each intersection of a rectangular coordinate array of magnetic field generating conductors for creating a local magnetic field pattern at said intersection, said array of conductors comprising a first set of generally parallel conductors extending in one direction and a second set of generally parallel conductors extending orthogonally thereto, each of said intersections being defined by one and only one conductor from each of said sets of conductors, and each of said predetermined positions being defined by the juxtaposition of an open bifilar loop portion in one of said intersection defining conductors adjacent to an open bifilar loop portion in the other of said intersection defining conductors;

c. means for permanently maintaining a predetermined number comprising at least one cylindrical magnetic domain at each of said intersections of said rectangular coordinate array;

d. means to move said cylindrical magnetic domain only within said plurality of contiguous domain retaining areas at said intersection in response to signals representative of the binary value of a bit of digital information; and e. means to detect the location of said cylindrical magnetic domain within said plurality of areas at any preselected one of said intersections.

6. A digital signal translating device as in claim 5 wherein said means to detect the location of said cylindrical magnetic domain within said plurality of areas of any preselected one of said intersections comprises:

a. a second uniaxially anisotropic ferromagnetic crystal platelet substantially identical to the first platelet and having similar position array defining means and magnetic domain maitaining and moving means, said second platelet being positioned in alignment with said first platelet so as to place the positions in the predetermined arrays of positions on each of said platelets in one to one correspondence; and b. means responsive to the movement of a magnetic domain into or out of one of said positions in said array in said second platelet to indicate the presence or absence of a magnetic domain at the corresponding position in the other of said crystal platelets.

7. A digital signal translating device comprising:

a. a rectangular matrix array of first and second sets of conductors, the conductors of said first set orthogonally intersecting the conductors of said second set, each of said conductors in each of said sets having two separate but contiguously positioned bifilar loop portions at each of said intersections;

b. magnetic means operatively associated with both of the loops of both conductors at each of said intersections, said magnetic means having remanent magnetization characteristics such that a coincident flow of current of a predetermined magnitude through both of said conductors at a given intersection is necessary to change the polarity of the remanent magnetization of said magnetic means at said intersection; and c. means for detecting the polarity of said remanent magnetization of said magnetic means, said detecting means comprising a moveable magnetic domain in a domain supporting medium, said domain being permanently retained in a location such that it is moved responsively to changes in said magnetic polarization of said magnetic means at said intersection; and d. means for detecting the position of said moveable magnetic domain.

8. A digital signal translating device as in claim 7 wherein said means for detecting the position of said first moveable magnetic domain comprises:

a second moveable magnetic domain in a second domain supporting medium positioned in operatively coupled relationship to said first domain supporting medium; and means responsive to movement of said second magnetic domain into or out of operatively coupled relationship with a predetermined portion of said location of said first magnetic domain to indicate the presence or absence of said first magnetic domain in a preselected portion of said location at said intersection.

9. A magnetic memory comprising:

a. first and second sheets of magnetic material, each of said sheets being of a type capable of sustaining discrete moveable magnetic domains therein;

b. memory forming means to define in said first sheet of magnetic material a set of predetermined positions for said magnetic domains to represent bits of digital information to be retained in memory by the presence or absence of magnetic domains in said positions; and c. interrogator means comprising means responsive to movement of a magnetic domain in said second sheet of magnetic material into or out of operatively coupled relationship with one of said predetermined positions in said first sheet to indicate the presence or absence of a magnetic domain in said one of said predetermined positions in said first sheet of material to thereby afford a nondestructive readout of said stored digital information.

10 A magnetic memory as in claim 9 wherein said interrogator means comprises a photodetector responsive to variation in the intensity of polarized light interacting with said first and second sheets of magnetic material, said variation resulting from said movement of said magnetic domain in said second sheet of magnetic material.

11. A magneto-optical signal translating device for binary digital signals comprising:

a. first and second optically translucent uniaxially anisotropic ferromagnetic crystal platelets of equal thickness juxtaposed in light transmitting relationship between first and second crossed polarizers, said crystal platelets being cut perpendicularly to their easy axes of magnetization and being capable in the presence of a magnetic biasing field of sustaining movable cylindrical magnetic domains having their cylindrical axes lying along the easy axes of magnetization;

b. means to magnetically bias said first and second platelets respectively with opposite polarities along their easy axis of magnetization so that their respective Faraday rotations will compensate each other and no light will normally pass through the system formed by said platelets and said crossed polarizers;

c. means to convert a first set of binary digital signal bits to cylindrical magnetic domains each occupying a predetermined position in one of said platelets and means to Convert a second set of binary digital reference signal bits to cylindrical magnetic domains each occupying a predetermined position in the other of said platelets;

d. said predetermined positions in said respective platelets being axially positioned in one-to-one correspondence to each other and the presence or absence of one of said cylindrical magnetic domains at a position affording a representation of the binary value of the signal bit at that position;

e. light source means to transilluminate said polarizers and platelets; and f. light detecting means positioned to receive light transmitted from said source through said polarizers and platelets only when at least one of said signal bits differs from its said corresponding reference bit.

12. Apparatus as in claim 11 wherein each of said predetermined positions is one of a pair of contiguous domain retaining areas defined at each intersection of a two coordinate rectangular array of magnetic field generating conductors for creating a local magnetic field pattern at said intersection.

13. A digital signal translating device comprising:

a. an optically translucent uniaxially anisotropic ferromagnetic crystal platelet having its major plane surface cut perpendicularly to the easy axis of magnetization of said crystal and being capable in the presence of an externally applied magnetic biasing field of sustaining movable cylindrical magnetic domains having their cylinder axes lying along said easy axis of magnetization;

b. means to define an array of predetermined positions in said crystal, the presence or absence respectively of one of said cylindrical magnetic domains in one or another of at least two predetermined subportions of any one of said positions in said array indicating the binary bit value of the digital signal represented at said position, said array defining means comprising first and second sets of insulatively intersecting conductors, each of said positions being defined by the intersection in magnetically coacting relationship of one conductor of one of said sets with one conductor of the other of said sets, each of said conductors of both of said sets having two separate but contiguously positioned bifilar loop portions at each of said intersections, the configuration of the conductor in said first set being a mirror image of the rotated configuration of the conductors of the second set, said two loop portions in each of said conductors being connected to form a single continuous current path with the rest of said conductOr, one loop portion in each of said intersecting conductors in one set being positioned to magnetically coact with one loop portion in one of said intersecting conductors in the other set to define at their intersection one of said subportionS of said position when a current flows through said conductor;

c. means to maintain one and only one cylindrical magnetic dOmain at each of said predetermined positions in said array;

d. means to apply a current to a preselected one conductor in each of said two sets of conductors to move said cylindrical domain from one to another of said predetermined subportions of said position; and e. means to detect which of said subportions is occupied by said cylindrical domain.

14. Apparatus as in claim 13 wherein said detecting means comprises means to sense the presence or absence of a change of the state of polarization of light passed through said position due to the presence or absence of one of said cylindrical domains in said subportion of said position.

15. Apparatus as in claim 13 wherein an opaque mask is positioned adjacent said crystal platelet, said mask having one hole therein positioned in registration with one and only one of said subportions of each of said positions.

16. In a digital signal translating device of the type utilizing cylindrical magnetic domains moveable in a plane parallel to a major surface of a crystal platelet, the improvement comprising a domain positioning magnetic field generating array of electrical conductors positioned in magnetic field coupled relationship to said crystal platelet, said array comprising:

a. a first set of electrical conductors extending in spaced parallel relationship to each other in a first direction in a first plane;

b. a second set of electrical conductors electrically insulated from said first set of conductors and extending in spaced parallel relationship to each other in a second direction in a second plane parallel to said first plane and positioned adjacent thereto to provide magnetic coupling between said first and second sets of conductors;

c. said first and second sets of conductors being geometrically related in a manner such that at least one line which orthogonally intersects both said first and said second planes defines at said respective points of intersection both a point in said first plane which is intersected by one of said conductors of said first set and a point in said second plane which is intersected by one of said conductors of said second set;

d. each of said conductors of each of said sets having at each of said intersection points a reversing double loop portion configured to retain in association with each of said loops at least one of said moveable domains within the magnetic field generated by electrical current flowing in a continuous path through each of said loops, said loops at each of said intersections being connected to the loops of at least one adjacent intersection by straight conductor runs which provide with said loops a single continuous path for flow of current in each of said conductors of each of said sets.

17. Apparatus as in claim 16 wherein each of said double loop portions has an open figure eight configuration centered at said point of intersection of said line with said plane, one of said loops extending in said plane on one side and the other of said loops extending in said plane on the other side of the projected line of said straight conductor runs connected thereto; said figure eight configuration being formed by a continuously curving conductor.

18. Apparatus as in claim 16 wherein each of said double loop portions has an open figure eight configuration centered at said point of intersection of said line with said plane, one of said loops extending in said plane on one side and the other Of said loops extending in said plane on the other side of the projected line of said straight conductor runs connected thereto; said figUre eight configuration comprising first and second curved portions respectively forming part of said one and said other of said loops, said first and second curved portions being joined to form a continuous current flow path by a straight conductor segment passing through said intersection point at an oblique angle to said projected line of said straight conductor runs.

19. Apparatus as in claim 16 wherein each of the conductors of said first set has a first geometric planar configuration and each of the conductors of said second set has a second geometric planar configuration, said second configuration being geometrically generated by taking the mirror image of said first configuration and rotating said mirror image by 90° in a plane parallel to the plane of said first configuration.

20. A digital signal translating device comprising:

a. first and second sheets of material, at least the first of said sheets being an optically translucent uniaxially anisotropic ferromagnetic crystal platelet having its major plane surface cut perpendicularly to the easy axis of magnetization of said crystal and being capable in the presence of a magnetic biasing field of sustaining movable cylindrical magnetic domains having their cylinder axes lying along said easy axis of magnetization;

b. means to establish in said crystal a magnetic biasing field having a direction and magnitude operative to sustain such cylindrical magnetic domains;

c. means independent of said second sheet to define a first array of predetermined positions relative to said major plane surface of said crystal, the presence or absence respectively of one of said cylindrical magnetic domains in one of two predetermined subportions of any one of said positions in said array indicating the binary bit value of the digital signal represented at said position;

d. domain control means responsive to electrical addressing signals for establishing said binary bit value of said digital signal represented at any one of said defined array of positions;

e. means to define a second array of positions in said second sheet, each of said positions having a juxtaposed one-to-one correspondence with at least one subportion of one of said positions in said first sheet; and f. readout means coacting with a characteristic of each of said defined positions in said second sheet and with a magnetic characteristic of said predetermined subportion of the corresponding position of said first sheet to indicate the presence or absence of said magnetic domain in said subportion to thereby afford a nondestructive readout of said digital information.

21. Apparatus as in claim 20 wherein said means to define said first array of predetermined positions comprises a matrix of orthogonally intersecting conductors on a translucent substrate, a first set of said conductors extending in a first direction in a plane parallel to said major plane surface of said crystal and a second set of said conductors extending in a direction perpendicular to said first direction in a plane parallel to said first plane; each of said conductors including an open double loop portion at each point of intersection with a conductor extending in a direction orthogonal to it, said double loop portions at said intersections of said conductors defining said predetermined positions of said array, each of said positions having two adjacent subportions respectively, each subportion being shaped and dimensioned by one of the loops of one conductor in each of said first and second sets of conductors to form a retaining magnetic field for one of said cylindrical magnetic domains.

22. Apparatus as in claim 20 wherein said domain control means comprises a small bar of magnetically coercive material extending between the two subportions of each of said predetermined positions.

23. Apparatus in claim 20 wherein said second sheet of material comprises a second ferromagnetic crystal platelet of equal size and thickness to said first platelet and positioned adjacent thereto along the path of a beam of polarized light, means to define an array of predetermined positions in said second platelet in one to one correspondence with the array of predetermined positions defined in said first platelet, means to establish a magnetic biasing field in said second platelet directed in antiparallel relationship to the magnetiC biasing field in said first platelet, and wherein said readout means comprises photodetector means positioned to receive said beam of polarized light transmitted through said first and second sheets of material.

24. Apparatus as in claim 20 wherein said second sheet of material comprises an opaque mask positioned adjacent to said ferromagnetic crystal said mask having holes located in positions which are in one to one correspondence with a portion of each of the positions in the array of positions in said crystal plate, each of said holes having a diameter of the order of magnitude of the diameter of said cylindrical domains, and means positioned to receive said beam of light transmitted through said plate, said mask, and said polarization analyzer wherein said readout means comprises means to transmit a beam of polarized light through said crystal and said mask and means to detect a change in the polarization of said light to indicate the presence or absence of a magnetic domain to thereby afford a nondestructive readout of said digital information.

* * * * *